United States Patent
Ichinose et al.

(10) Patent No.: US 6,692,796 B2
(45) Date of Patent: Feb. 17, 2004

(54) LIQUID CRYSTALLINE MEDIUM AND LIQUID CRYSTAL DISPLAY

(75) Inventors: Hideo Ichinose, Kanagawa Pref. (JP); Shinji Nakajima, Kanagawa Pref. (JP); Yasushi Sugiyama, Kanagawa Pref. (JP)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 36 days.

(21) Appl. No.: 10/046,288

(22) Filed: Jan. 16, 2002

(65) Prior Publication Data

US 2003/0052306 A1 Mar. 20, 2003

(30) Foreign Application Priority Data

Jan. 19, 2001 (EP) .............................. 01101237

(51) Int. Cl.[7] .......................... C09K 19/12; C09K 19/30
(52) U.S. Cl. ............... 428/1.1; 252/299.66; 252/299.63
(58) Field of Search ...................... 428/1.1; 252/299.63, 252/299.66

(56) References Cited

U.S. PATENT DOCUMENTS

| | | | | |
|---|---|---|---|---|
| 6,080,451 A | * | 6/2000 | Hirschmann et al. | 428/1.1 |
| 6,514,579 B1 | * | 2/2003 | Hirschmann et al. | 428/1.1 |
| 6,531,194 B2 | * | 3/2003 | Hirschmann et al. | 428/1.1 |
| 6,544,602 B1 | * | 4/2003 | Hirschmann et al. | 428/1.1 |

* cited by examiner

*Primary Examiner*—Shean C. Wu
(74) *Attorney, Agent, or Firm*—Millen, White, Zelano & Branigan, P.C.

(57) ABSTRACT

The instant invention relates to liquid crystal media comprising a component A, comprising one or more compounds of formula I

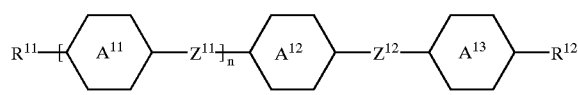

I and a component B, comprising one or more compounds of formula II

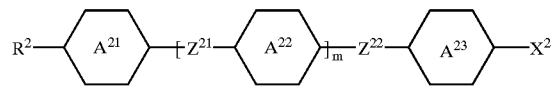

II wherein the parameters are as defined in the text and to liquid crystal displays comprising these media, in particular to TN AMD displays.

19 Claims, No Drawings

LIQUID CRYSTALLINE MEDIUM AND LIQUID CRYSTAL DISPLAY

FIELD OF THE INVENTION

The present invention relates to liquid crystalline media and to liquid crystal displays comprising these media, preferably to displays operating in the TN mode and in particular to TN displays addressed by an active matrix.

PROBLEM TO BE SOLVED AND STATE OF THE ART

<u>L</u>iquid <u>C</u>rystal <u>D</u>isplays (LCDs) are widely used to display information. Still the most widely used electro-optical mode is the <u>t</u>wisted <u>n</u>ematic (TN)-mode. Besides this mode also displays using the <u>s</u>uper <u>t</u>wisted <u>n</u>matic (STN)- and the <u>e</u>lectrically <u>c</u>ontrolled <u>b</u>irefringence (ECB)-mode with their various modifications, as well as others. Besides these modes, which all do use an electrical field, which is substantially perpendicular to the substrates, respectively to the liquid crystal layer, there are also electro-optical modes employing an electrical field substantially parallel to the substrates, respectively the liquid crystal layer, like e.g. the <u>i</u>n-<u>p</u>lane <u>s</u>witching (IPS)-mode (as disclosed e.g. in DE 40 00 451 and EP 0 588 568).

A further promising electrooptical mode for LCDs is the <u>o</u>ptically <u>c</u>ompensated <u>b</u>end (OCB) mode. This mode has a favorable small viewing angle dependence of the contrast. Further the response times in this mode are small.

Especially for micro displays operating in the TN-mode, fast switching cells have to be realized. For this task the cell gap preferably is reduced, which in turn requires liquid crystalline media with higher values of the birefringence.

Preferably TN-cells are operated with an optical retardation corresponding the first transmission minimum according to Gooch and Tarry.

Liquid crystal mixtures consisting predominantly or even entirely of terminally cyano substituted biphenyls and terphenyls are as a rule characterized by suitable high Δε values, but have limited values of Δn and already are likely to show insufficient stability at low temperatures, i.e. in most cases either formation of a smectic phase and or crystallization. Liquid crystal mixtures using large quantities of halogenated tolane compounds with three phenyl rings, which are almost dielectrically neutral, are disclosed, e.g. in the European Patent Application No. EP 99111782.1 are characterized by comparatively low Δε values which are not suitable for most applications and often even show severe problems with respect to the stability of the nematic phase at low temperatures.

Thus, there is a significant need for liquid crystal media with suitable properties for practical applications such as a wide nematic phase range, low viscosities, appropriate optical anisotropy Δε according to the display mode used especially a suitably high Δn for OCB displays and for composite systems like PDLCs and in particular with suitably large good compatibility with polymer precursors for composite systems.

PRESENT INVENTION

Surprisingly, it now has been found that liquid crystal media with high Δn especially useful for fast switching TN AMD displays can be realized, which do not exhibit these drawbacks of the materials of the prior art or at least do exhibit them to a significantly lesser degree.

These improved liquid crystal media according to the instant application are realized by comprising at least two components:

a first liquid crystal component (called component A), comprising compounds of formula I, which are compounds with very high values of Δn, preferably of 0.15 or more, more preferably 0.15 to 0.80, more preferably 0.20 to 0.60, more preferably of 0.22 or more and most preferably of 0.25 to 0.55.

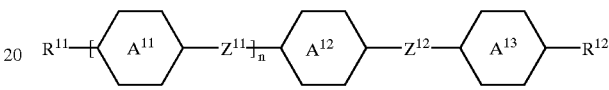

I wherein $R^{11}$ and $R^{12}$ are, independently of one another, n-alkyl, n-alkoxy with 1 to 7 C atoms, preferably 2 to 5 C atoms, alkenyl, alkenyloxy or alkoxyalkyl with 2 to 7 C atoms, preferably with 2 to 5 C atoms, preferably alkyl, alkenyl or alkoxy, especially preferred n-alkyl or n-alkoxy, at least one of

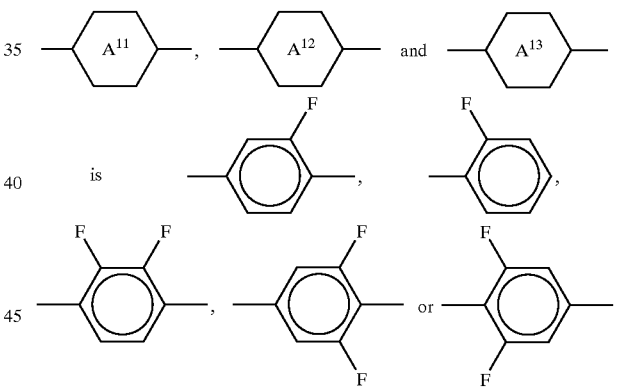

and the others of

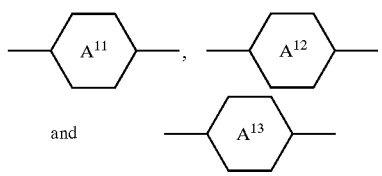

each, independently of each other, are

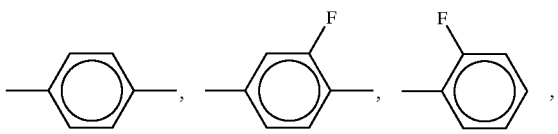

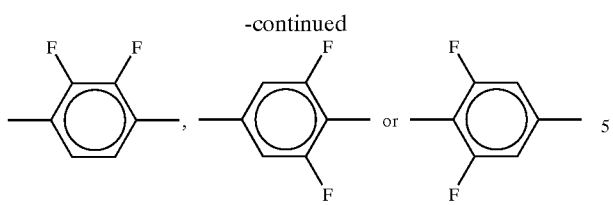

and alternatively

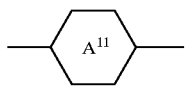

may also be

one of $Z^{11}$ and $Z^{12}$ is —C≡C— and the other one, if present, is —C≡C—, —CH$_2$O—, —CF$_2$O—, —OCF$_2$— trans- —CH=CH—, trans- —CF=CF—, —COO— —CH$_2$—CH$_2$—, —CF$_2$—CF$_2$— or a single bond, preferably a single bond and n is 0 or 1, preferably

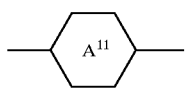

when present, is

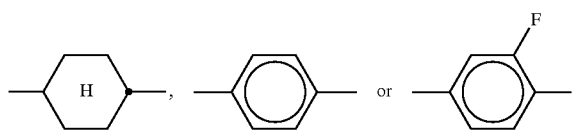

or their mirror images,
and/or preferably

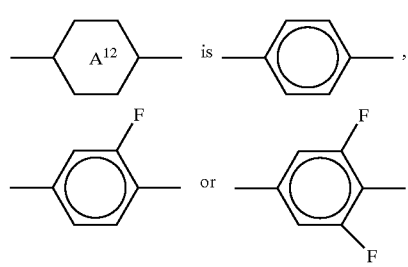

or their mirror images,
and/or preferably

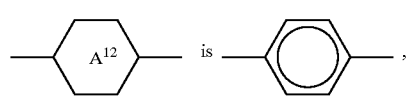

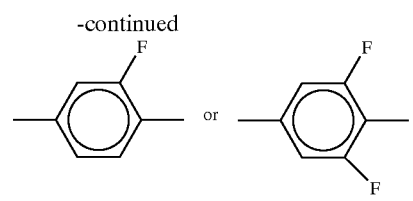

or their mirror images, and simultaneously a second component (component B) comprising one or more dielectrically positive compounds of formula II

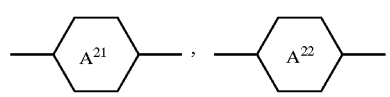

II wherein $R^2$ has the meaning given for $R^{11}$ under formula I above,

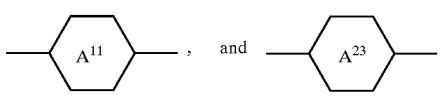

each independently have the meaning given for

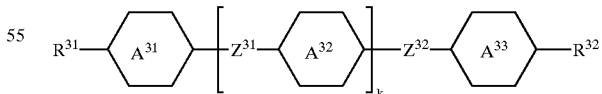

above under formula I $Z^{21}$ $Z^{22}$ are independently of each other —CH$_2$CH$_2$—, —COO—, trans- CH=CH—, trans- —CF=CF—, —CH$_2$O—, —CF$_2$O— or a single bond, preferably at least one of them is a single bond, most preferably both are a single bond, $X^2$ is, F, Cl, CF$_3$, OCF$_2$H or OCF$_3$, preferably F or OCF$_3$, most preferably F and m is 0, 1 or 2 and optionally a third component (component C) which comprises dielectrically neutral compounds of formula III

III wherein $R^{31}$ and $R^{32}$ each, independently of each other, have the meaning given for $R^{11}$ under formula I above, $Z^{31}$ and $Z^{32}$ are, independently of each other, —CH$_2$CH$_2$—, —COO—, —C≡C—, trans- CH≡CH—, trans- —CF=CF—, —CH$_2$O—, —CF$_2$O— or a single bond, preferably a single bond,

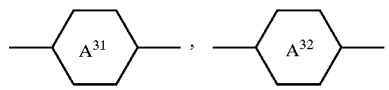

each independently have the meaning given for

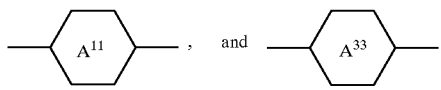

above under formula I k is 0 or 1 and optionally a fourth component (component D) which comprises dielectrically neutral compounds of formula IV

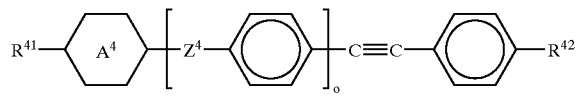

IV wherein $R^{41}$ and $R^{42}$ independently of each other, have the meaning given above under formula I for $R^{11}$,

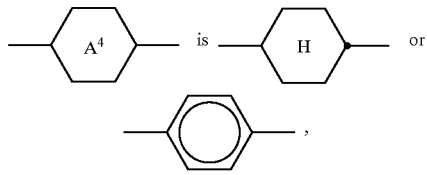

$Z^4$ are, independently of each other, —CH$_2$CH$_2$—, —COO—, —C≡C— or a single bond, preferably a single bond and o is 0 or 1.

Preferably the liquid crystalline media according to the instant invention contain a component A comprising, preferably predominantly consisting of and most preferably entirely consisting of compounds of formula I.

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The compounds of formula I are preferably selected from the group of sub-formulae I-1 to I-7

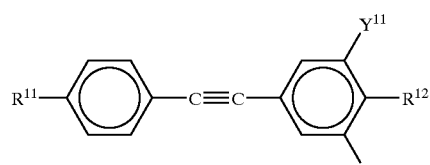

I-1

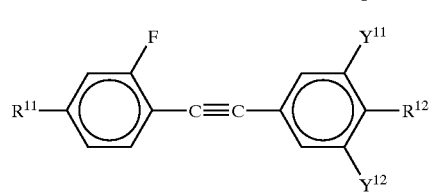

I-2

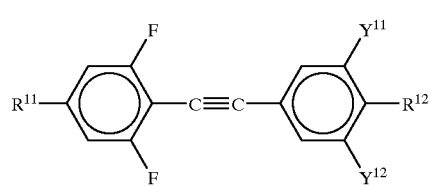

I-3

I-4

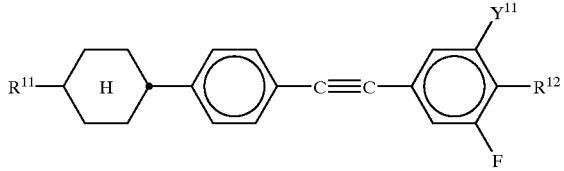

I-5

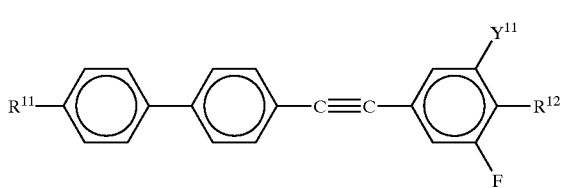

I-6

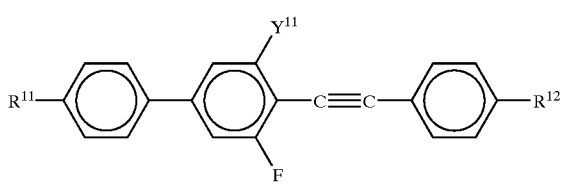

I-7

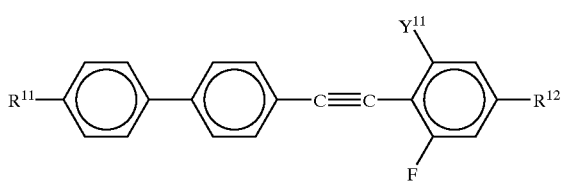

wherein $R^{11}$ and $R^{12}$ have the meaning given under formula I above $Y^{11}$ and $Y^2$ are, independently of each other, H or F.

In a preferred embodiment the liquid crystalline media according to the instant invention contains a component B comprising, preferably predominantly consisting of and most preferably entirely consisting of compounds of formula II.

The compounds of formula II are preferably selected from the group of sub-formulae II-1 to II-7

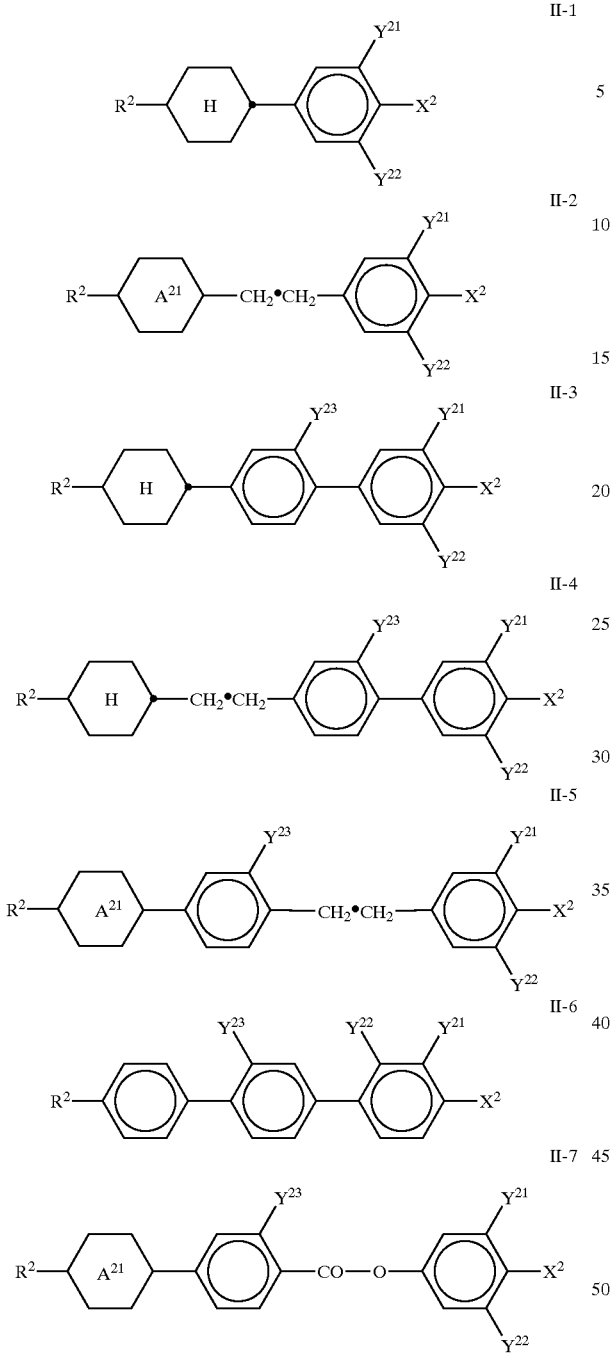

II-1, II-2, II-3, II-4, II-5, II-6, II-7 wherein $R^2$, $X^2$ and

have the respective meanings given under formula II above and preferably $R^2$ is n-alkyl or 1-E-alkenyl,
$X^2$ is F or $OCF_3$ and

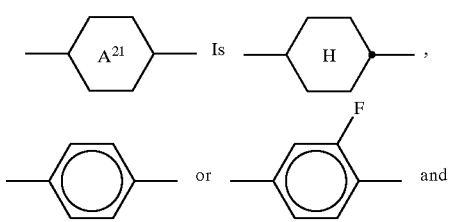

$Y^{21}$, $Y^{22}$ and $Y^{23}$ are, independently of each other, H or F.

In a further preferred embodiment the liquid crystal medium contains a liquid crystal component C which is preferably predominantly consisting of and most preferably entirely consisting of compounds of formula III The compounds of formula III are preferably selected from the group of sub-formulae III-1 to III-6

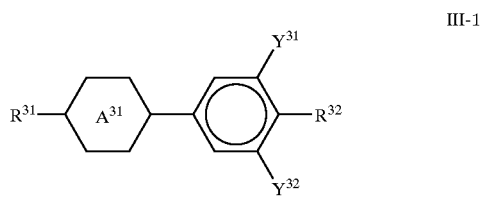

III-1

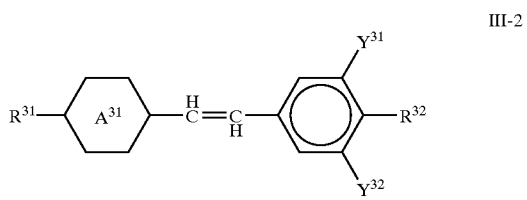

III-2

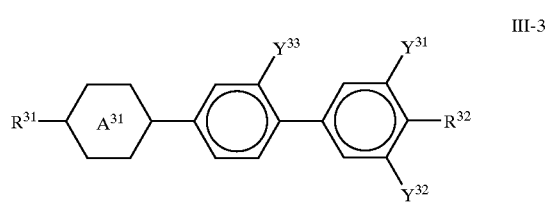

III-3

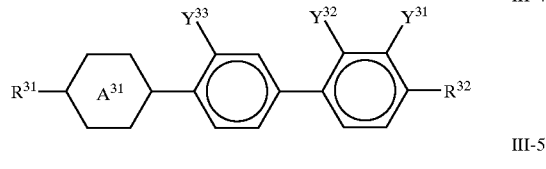

III-4

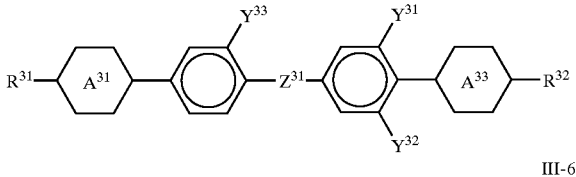

III-5

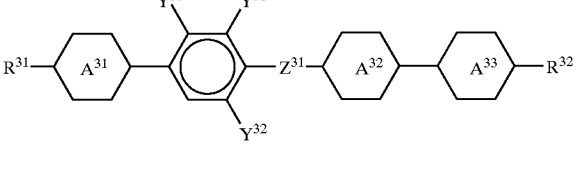

III-6 wherein $R^{31}, R^{32}, Z^{31},$

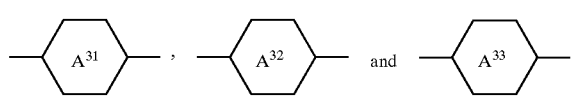

each have the meaning given for

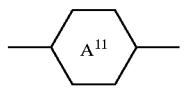

under formula I above, and preferably $R^{31}$ and $R^{32}$ are, independently of each other, n-alkyl, n-alkoxy or 1-E-alkenyl, $Z^{31}$ is —COO—, —CH$_2$—CH$_2$—, trans- —CH=CH—, trans- —CF=CF—, —CF$_2$O—, —CH$_2$O— or a single bond, preferably —COO— or a single bond,

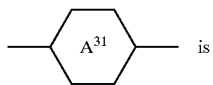 is

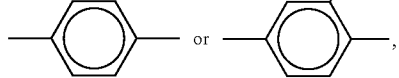

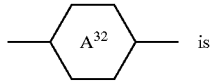 is

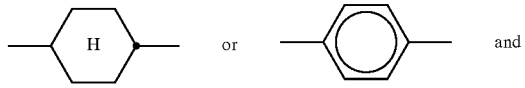 and

 is

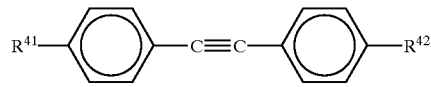

$Y^{31}$, $Y^{32}$ and $Y^{33}$ are, independently of each other, H or F.

This component C may be present, and preferably is present, besides component B.

In a further preferred embodiment the liquid crystal medium contains a liquid crystal component D which is preferably predominantly consisting of and most preferably entirely consisting of compounds of formula IV The compounds of formula IV are preferably selected from the group of sub-formulae IV-1 to IV-4

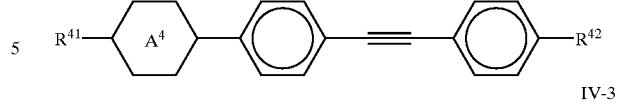

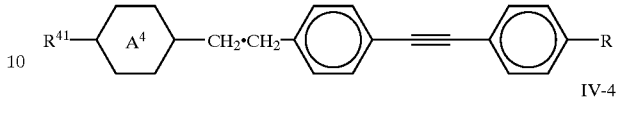

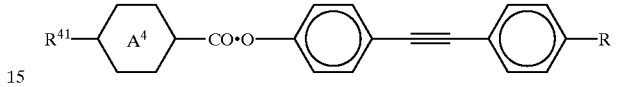

IV-4

$R^{41}$—A$^4$—CO·O—⟨⟩—≡—⟨⟩—R wherein $R^{41}, R^{42}$ and

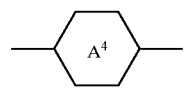

have the meaning given under formula IV above and preferably $R^{41}$ is n-alkyl, $R^{42}$ is alkoxy and

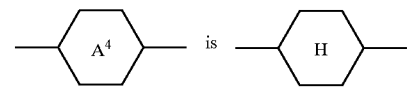

Most preferably the medium contains compounds of formula I selected from the group of sub-formulae I-1 to I-3 and I-5 to I-7. Most preferably of sub-formula I-7 and in particular of sub-formula I-7a, given above, wherein $R^{11}$ and $R^{12}$ have the respective meanings given under formula I above, and preferably are, independently of each other, n-alkyl with 1 to 5 C atoms or n-alkoxy with 1 to 4 C atoms, or 1-E-alkenyl with 2 to 5 C atoms.

Preferably component B comprises one or more compounds selected from the group of compounds of sub-formulae II-3a to II-3h, II-6a to II-6f and II-7a to II-7c

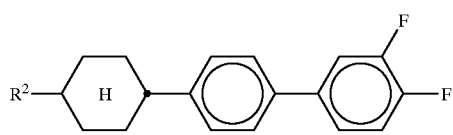

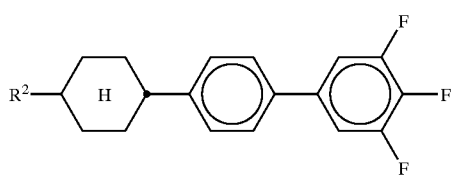

-continued

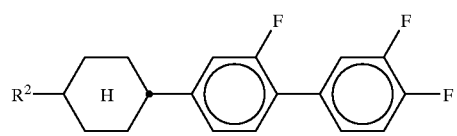
II-3c

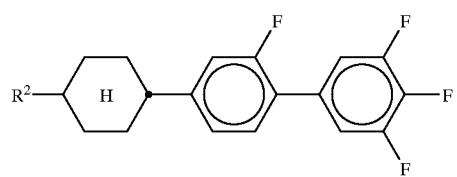
II-3d

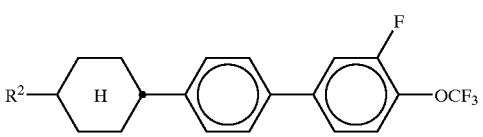
II-3e

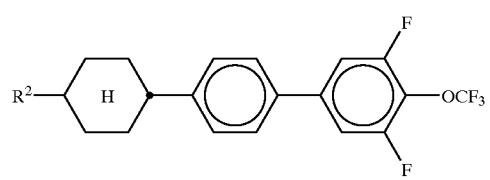
II-3f

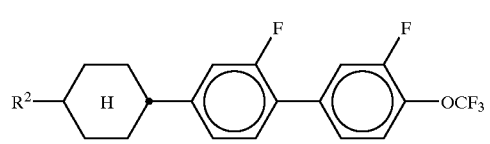
II-3g

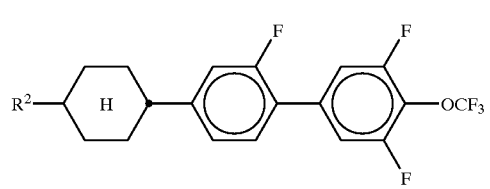
II-3h

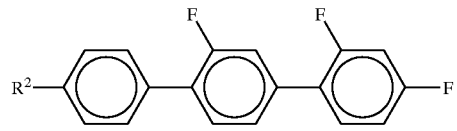
II-6a

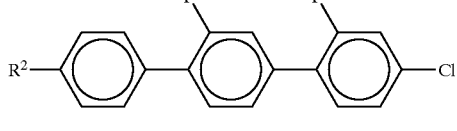
II-6b

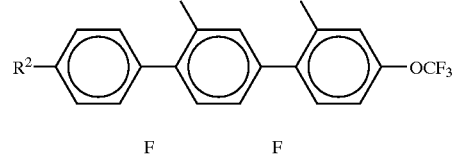
II-6c

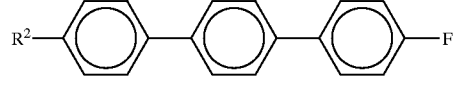
II-6d

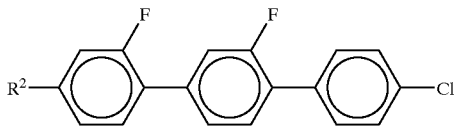
II-6e

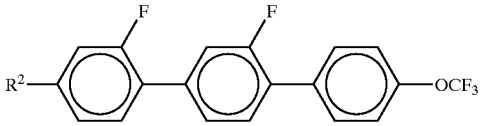
II-6f

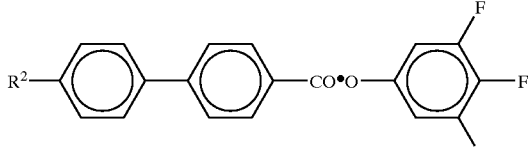
II-7a

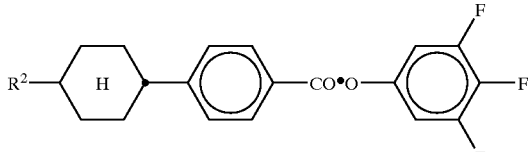
II-7b

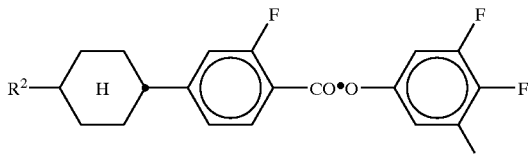
II-7c wherein $R^2$ has the meaning given under formula II above and preferably is alkyl with 1 to 5 C atoms, alkoxy with 1 to 4 C atoms or 1-E-alkenyl with 2 to 5 C atoms.

Preferably component C comprises one or more compounds selected from the group of compounds of sub-formulae III-1a, III-2a, III-3a, III-3b III-5a and III-5b

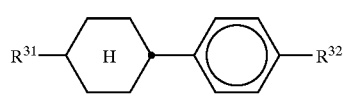
III-1a

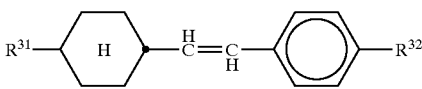
III-2a

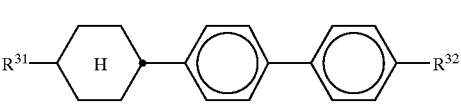
III-3a

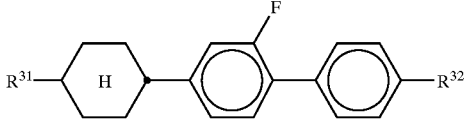
III-3b

-continued

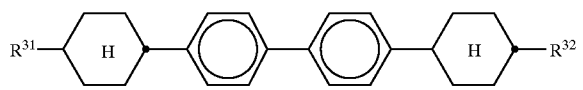

III-5a

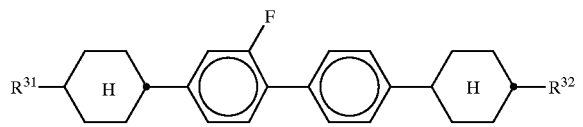

III-5b wherein
$R^{31}$ and $R^{32}$ have the respective meanings given under formula III above, and preferably $R^{31}$ is n-alkyl or 1-E-alkenyl and $R^{32}$ is n-alkyl, alkoxy or alkenyl, preferably both with 1, respectively 2, to 5 C atoms.

Preferably component D comprises one or more compounds selected from the group of compounds of formula IV-1, as given above, and sub-formulae IV-2a and IV-2b

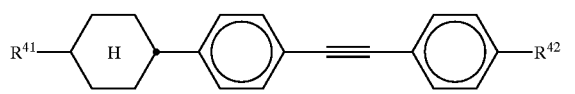

IV-2a

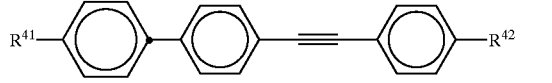

IV-2b wherein
$R^{41}$ and $R^{42}$ have the meaning given under formula IV above and preferably $R^{41}$ is n-alkyl and $R^{42}$ is alkoxy.

Preferably the media according to the present invention are composed as follows, in % by weight.

Component A is used in a concentration from 5 to 50%, preferably from 15 to 45% and most preferably from 25 to 40% of the total mixture.

Component B is used in a concentration from 15 to 65%, preferably from 25 to 60% and most preferably from 35 to 55% of the total mixture.

Component C is used in a concentration from 0 to 50%, preferably from 10 to 40% and most preferably from 15 to 35% of the total mixture.

Component D is used in a concentration from 0 to 40%, preferably from 2 to 30% and most preferably from 3 to 20% of the total mixture.

The media according to the present invention optionally contain further compounds, which are used to adjust especially the phase range and the optical anisotropy of the media.

The total concentration of these further compounds in the liquid crystal medium according to the present invention is preferably 0 to 30%, more preferably 0 to 25%, most preferably 0 to 15% and in particular 5 to 10%.

Preferably the liquid crystal medium contains 50% to 100%, more preferably 70% to 100% and most preferably 80% to 100% and in particular 90% to 100% totally of components A, B, C and D, which, in turn, contain, preferably predominantly consist of and most preferably entirely consist of one or more of compounds of formulae I, II, III and IV, respectively.

The liquid crystal media according to the instant invention are characterized by a clearing point of 70° C. or more, preferably of 80° C. or more, especially preferred of 85° C. or more and in particular of 90° C. or more.

The Δn of the liquid crystal media according to the instant invention is 0.14 or more, preferably 0.17 or more, preferably in the range from 0.18 to 0.35, more preferably in the range from 0.19 to 0.30, most preferably in the range from 0.20 to 0.28 and in particular in the range from 0.20 to 0.25.

The Δε, at 1 kHz and 20° C., of the liquid crystal medium according to the invention is preferably 5 or more, preferably 6 or more, most preferably 8 or more and in particular 10 or more.

Preferably the nematic phase of the inventive media extends at least from 0° C. to 70° C., most preferably at least −20° C. to 70° C. and most preferably at least from −30° C. to 80° C., wherein at least means that preferably the lower limit is under cut, whereas the upper limit is surpassed.

In the present application the term dielectrically positive compounds describes compounds with Δε>1.5, dielectrically neutral compounds are compounds with −1.5 ≦Δε≦1.5 and dielectrically negative compounds are compounds with Δε<−1.5. The same holds for components. Δε is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All % values for prepartians of components are by weight unless indicated otherwise. All physical properties have been and are determined according to "Merck Liquid Crystals, Physical Properties of Liquid Crystals", Status Nov. 1997, Merck KGaA, Germany and are given for a temperature of 20° C., unless explicitly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties have been determined with test cells prepared at Merck KGaA, Germany. The test cells for the determination of Δε had a cell gap of 22 μm. The electrode was a circular ITO electrode with an area of 1.13 cm² and a guard ring. The orientation layers were lecithin for homeotropic orientation (ε∥) and polyimide AL-1054 from Japan Synthetic Rubber for homogeneuous orientation (ε⊥). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)-mid grey ($V_{50}$) - and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMDs, ECB- or VAN-AMDs, IPS- and OCB-LCDs and in particular in TN-AMDs.

The melting point T(C,N), the transition from the smectic (S) to the nematic (N) phase T(S,N) and the clearing point T (N,I) of the liquid crystals are given in degrees centigrade (Celsius).

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$, and $C_mH_{2m+1}$, are straight chain alkyl groups with n respectively m C atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
| --- | --- | --- | --- | --- |
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| $nCF_3$ | $C_nH_{2n+1}$ | $CF_3$ | H | H |
| $nCF_3$.F | $C_nH_{2n+1}$ | $CF_3$ | H | F |
| $nCF_3$.F.F | $C_nH_{2n+1}$ | $CF_3$ | F | F |
| $nOCF_3$ | $C_nH_{2n+1}$ | $OCF_3$ | H | H |
| $nOCF_3$.F | $C_nH_{2n+1}$ | $OCF_3$ | H | F |
| $nOCF_3$.F.F | $C_nH_{2n+1}$ | $OCF_3$ | F | F |
| $nOCF_2$ | $C_nH_{2n+1}$ | $OCHF_2$ | H | H |
| $nOCF_2$.F | $C_nH_{2n+1}$ | $OCHF_2$ | H | F |
| $nOCF_2$.F.F | $C_nH_{2n+1}$ | $OCHF_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |

TABLE A

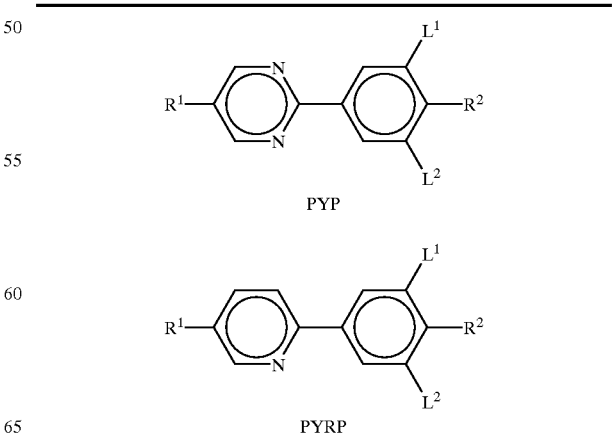

PYP

PYRP

TABLE A-continued
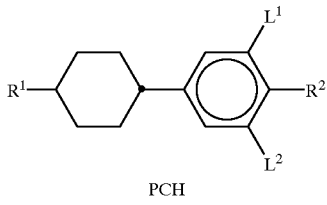
PCH
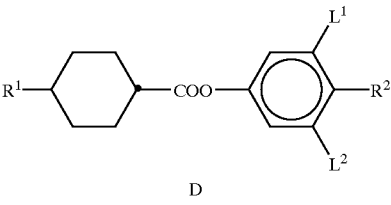
EPCH
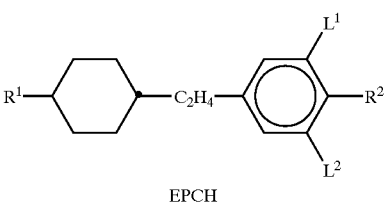
BCH
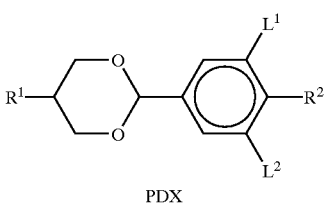
CCP
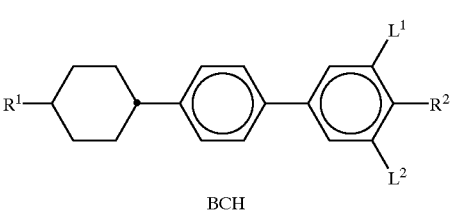
PTP
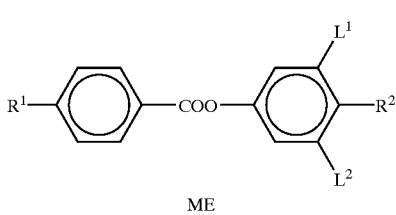
CPTP
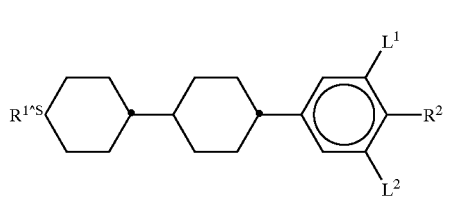
CEPTP
TABLE A-continued
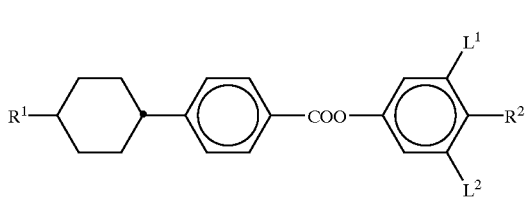
D
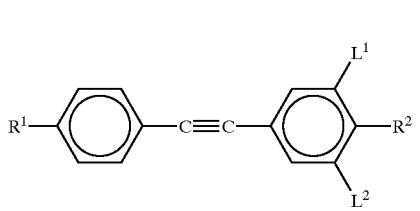
PDX
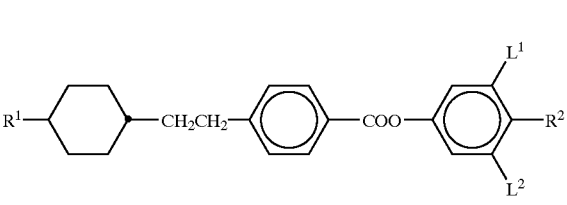
ME
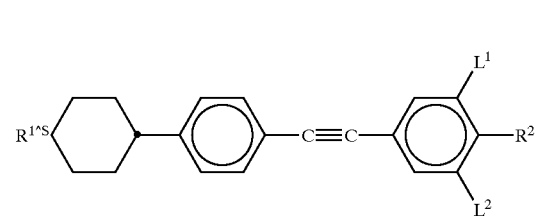
HP
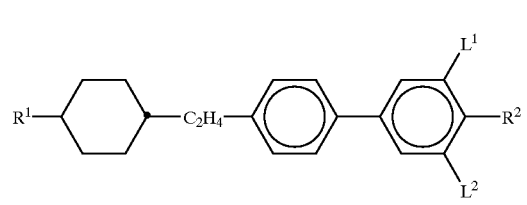
EHP
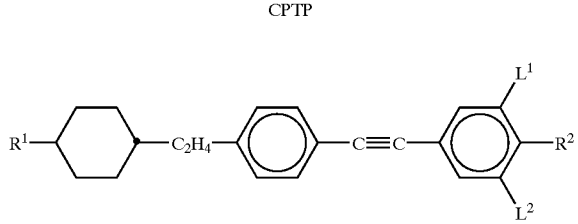
BECH
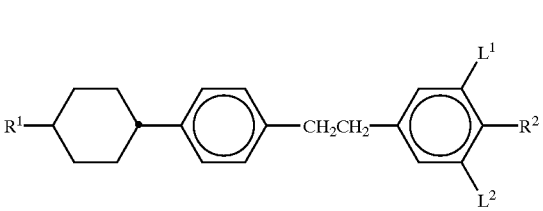
EBCH

TABLE A-continued
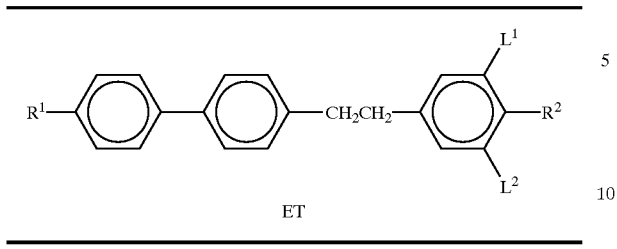
ET
TABLE B
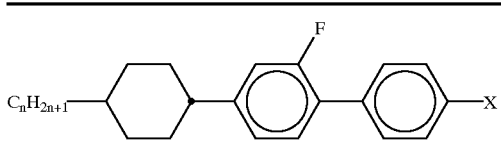
BCH-n.FX
(X = F, Cl, OCF$_3$)
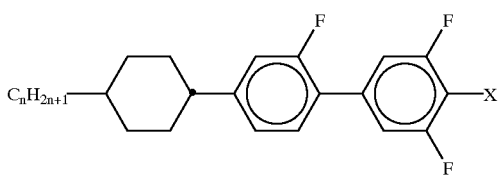
CGU-n-X
(X = F, Cl, OCF$_3$)
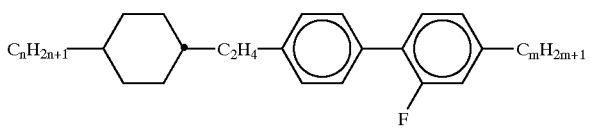
Inm
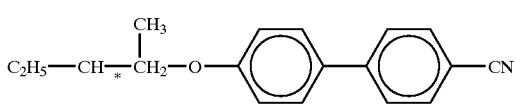
C15
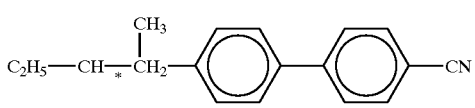
CB15
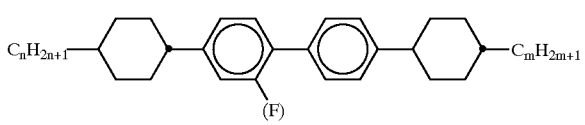
CBC-nm(F)
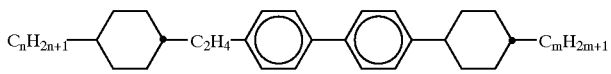
ECBC-nm TABLE B-continued
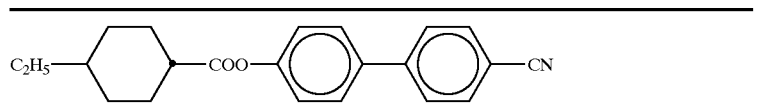
CHE
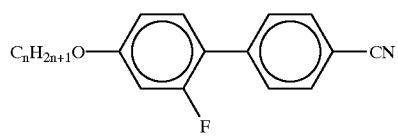
B-nO.FN
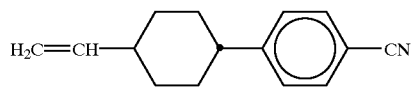
CP-V-N
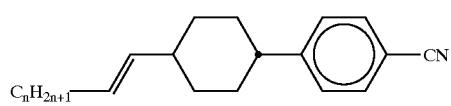
CP-nV-N
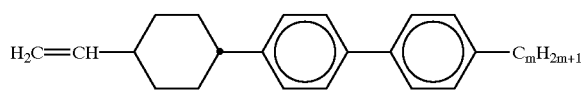
CPP-V-m
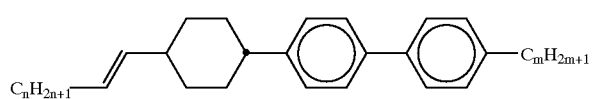
CPP-nV-m
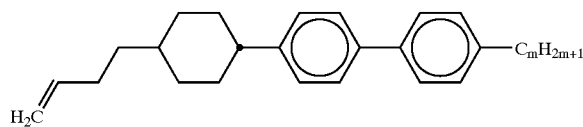
CPP-V2-m
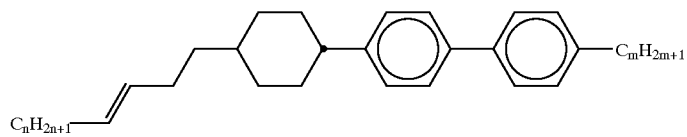
CPP-nV2-m
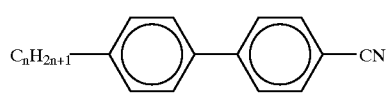
K3·n
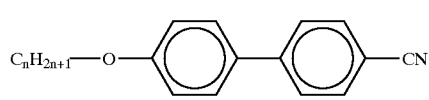
M3·n TABLE B-continued

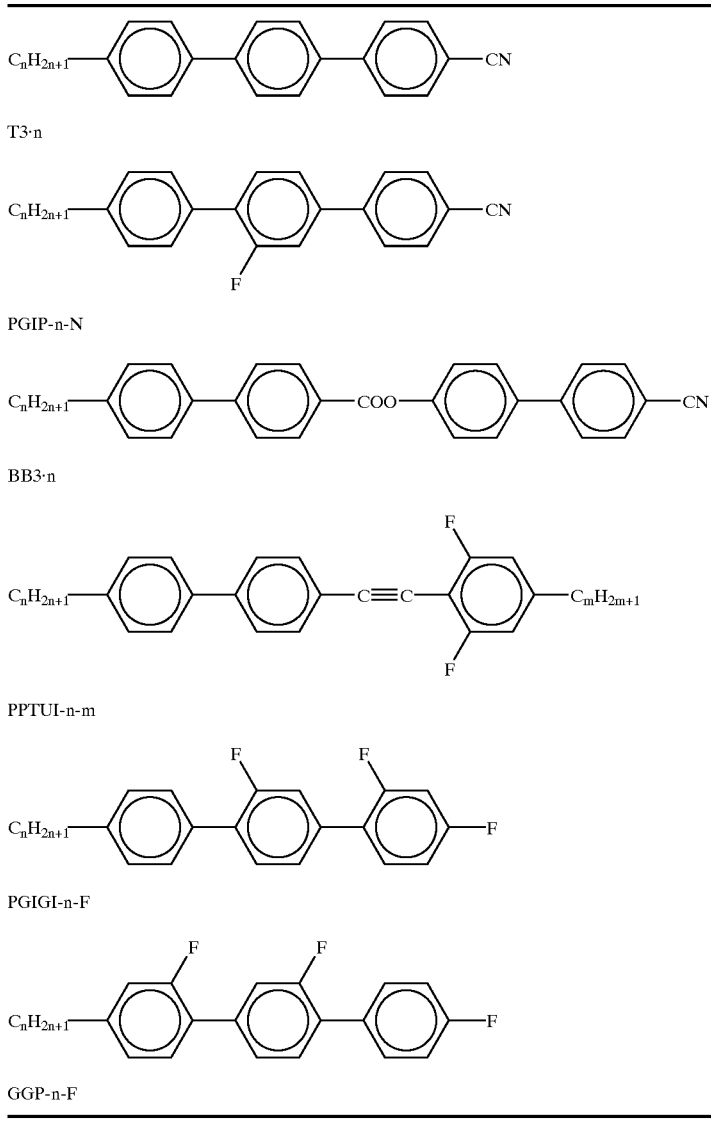

T3-n

PGIP-n-N

BB3-n

PPTUI-n-m

PGIGI-n-F

GGP-n-F

The liquid crystal media according to the instant invention contain preferably
- seven or more, preferably nine or more, compounds selected from the group of compounds of tables A and B and/or
- four or more, preferably five or more, compounds selected from the group of compounds of table B and/or
- four or more, preferably six or more, compounds selected from the group of compounds of table A.

The entire disclosure[s] of all applications, patents and publications, cited above or below, and of corresponding European Application No. EP 01101237.4, filed Jan. 19, 2001, is hereby incorporated by reference.

EXAMPLES

The examples given in the following are illustrating the present invention without limiting it in any way.

However, the phyiscal data of the media illustrate to the expert which properties can be achieved in which ranges. Especially the combination of the various properties which can be preferably achieved is thus well defined.

Example 1

A liquid crystal mixture is realized with the composition and properties given in the following table.

| Composition | | Physical Properties | |
|---|---|---|---|
| Compound Abbreviation | Conc./% | | |
| PPTUI-3-2 | 14.0 | $T(N,I)$ = | 85.0° C. |
| PPTUI-3-4 | 14.0 | $T(S,N)$ < | −20° C. |
| BCH-2F.F | 10.0 | $n_e$ (20° C., 589.3 nm) = | 1.7107 |
| BCH-3F.F | 10.0 | $\Delta n$ (20° C., 589.3 nm) = | 0.2005 |
| BCH-5F.F | 5.0 | $\epsilon_\parallel$ (20° C., 1 kHz) = | 9.0 |
| CGU-2-F | 8.0 | $\Delta\epsilon$ (20° C., 1 kHz) = | 5.2 |
| CGU-3-F | 8.0 | $V_{10}$ (20° C.) = | 1.43 V |

-continued

| Composition | | |
|---|---|---|
| Compound Abbreviation | Conc./% | Physical Properties |
| PCH-301 | 15.0 | |
| PCH-302 | 6.0 | |
| PGIGI-3-F | 5.0 | |
| PTP-102 | 5.0 | |
| Σ | 100.0 | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal medium, comprising:

15–40% by weight of a component A which comprises one or ore compounds of formula I:

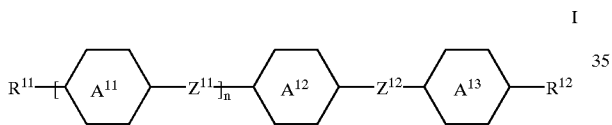

I wherein
$R^{11}$ and $R^{12}$ are, independently of one another, n-alkyl, n-alkoxy with 1 to 7 C atoms, alkenyl, alkenyloxy or alkoxyalkyl with 2 to 7 C atoms,
at least one of the $A^{11}$, $A^{12}$ and 13 rings is

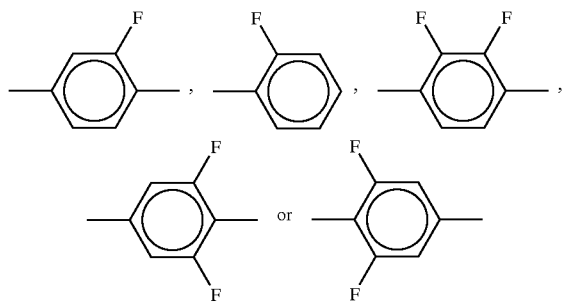

and the others of the $A^1$, $A^{12}$ and $A^{13}$ rings are each, independently of each other,

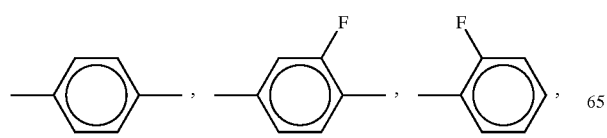

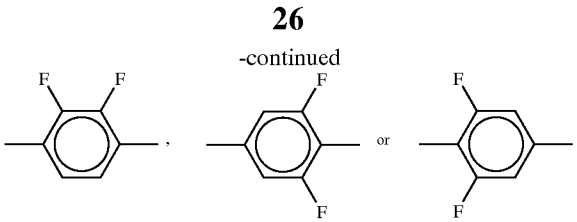

and further optionally the $R^{11}$ring is

one of $Z^{11}$ and $Z^{12}$ is —C≡C— and the other one, if present, is —C≡C—, —CH$_2$O—, —CF$_2$O—, —OCF$_2$—, trans- —CH=CH—, trans —CF=CF—, —COO—, —CH$_2$—CH$_2$—, —CF$_2$—CF$_2$— or a single bond, and
n is 0 or 1; and 25–60% by weight of a component B which comprises one or more dielectrically positive compounds of formula II:

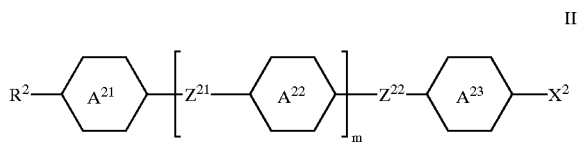

II wherein
$R^2$ has the meaning given for $R^{11}$ in this claim, the $A^{21}$, $A^{22}$ and $A^{23}$ rings each independently have the meaning given for the A ring above
$Z^{21}$ and $Z^{22}$ are independently of each other —CH$_2$CH$_2$—, —COO—, trans- —CH=CH—, trans-CF=CF—, —CH$_2$O—, —CF$_2$O— or a single bond,
$X^2$ is, F, Cl, CF$_3$, OCF$_2$H or OCF$_3$ and
m is 0, 1 or 2; and 6–40% by weight of a component C, which comprises one or ore compounds of formula III:

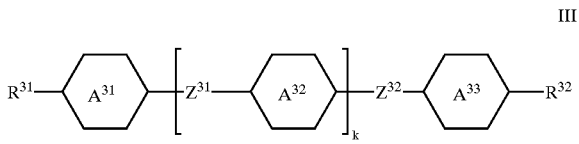

III wherein
$R^{31}$ and $R^{32}$ each, independently of each other, have the meaning given for $R^{11}$,
$Z^{31}$ and $Z^{32}$ are, independently of each other, —CH$_2$C$_2$—, —COO—, —C≡C—, trans- —CH=CH—, trans- —CF=CF—, —CH$_2$O, —CF$_2$O— or a single bond,
the $A^{31}$, $A^{32}$ and $A^{33}$ rings each have the meaning given for the $A^{11}$ ring, and
k is 0 or 1; and 2–30% of a component D comprising one or more compounds of formula IV:

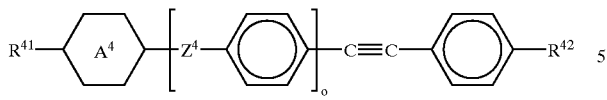

IV wherein
$R^{41}$ and $R^{42}$ each, independently of each other, have the meaning given for $R^{11}$,

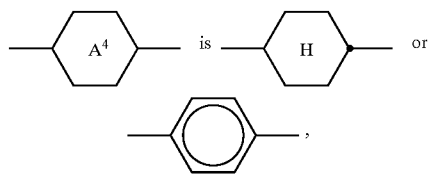

$Z^4$ are, independently of each other, —CH$_2$CH$_2$—, —COO—, —C≡C— or a single bond, preferably a single bond and o is 0 or 1.

2. A liquid crystal medium according to claim 1, wherein component A comprises one or more compounds of formula I where

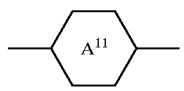

when present, is

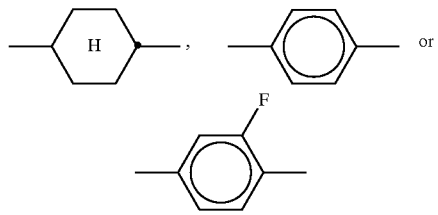

or their mirror images, and/or

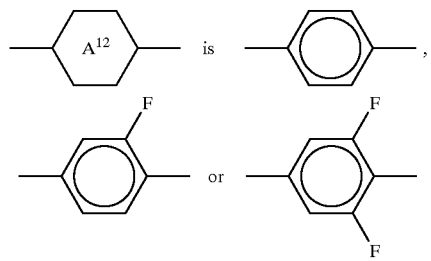

or their mirror images, and/or

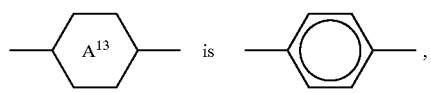

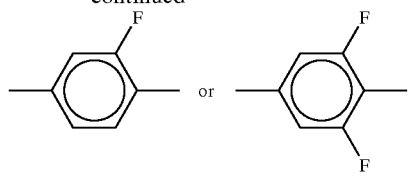

or their mirror images.

3. A liquid crystal medium according to claim 1, wherein component A comprises one or more compounds of formula I-7:

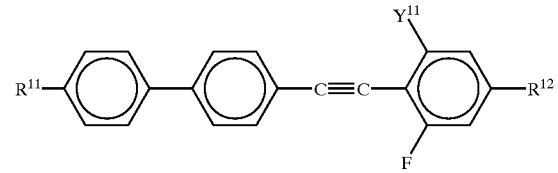

I-7 wherein $R^{11}$ and $R^{12}$ have the meanings given and $Y^{11}$ is H or F.

4. A liquid crystal display, which comprises a liquid crystal medium according to claim 1.

5. A liquid crystal display according to claim 4, which operates in the TN mode.

6. A liquid crystal display according to claim 4, which addresses by an active matrix.

7. A liquid crystal medium of claim 1, which contains 70–100% by weight of components A, B, C, and D.

8. A liquid crystal medium of claim 1, which has a clearing point of 70° C. or more, a Δn of 0.14 or more, a Δε at 1KH$_z$ and 20° C. of 5 or more and a nematic phase at least encompassing from 0° C. to 70° C.

9. A liquid crystal display which addresses by an active matrix and which comprises a liquid crystal medium, wherein the medium comprises:

a component A which comprises one or more compounds of formula I:

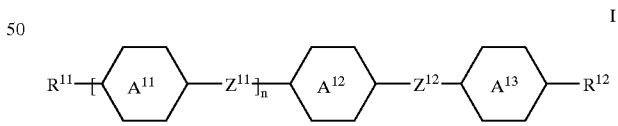

I wherein
$R^{11}$ and $R^{12}$ are, independently of one another, n-alkyl, n-alkoxy with 1 to 7 C atoms, alkenyl, alkenyloxy or alkoxyalkyl with 2 to 7 C atoms,
at least one of the $A^{11}$, $A^{12}$ and $A^{13}$ rings is

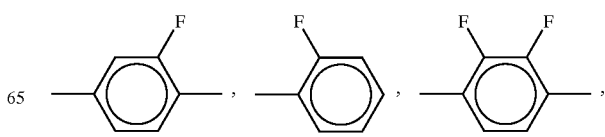

-continued

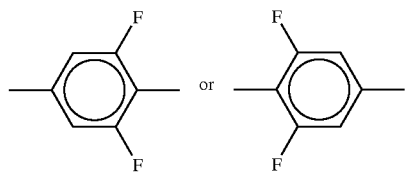

and the others of the $A^{11}$, $A^{12}$ and $A^{13}$ rings are each, independently of each other,

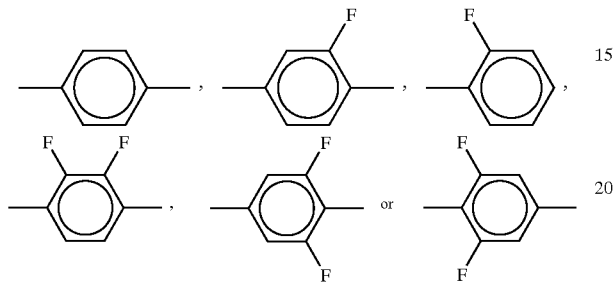

and further optionally the $A^{11}$ ring is

one of $Z^{11}$ and $Z^{12}$ is —C≡C— and the other one, if present, is —C≡C—, —CH$_2$O—, —CF$_2$O—, —OCF$_2$— trans- —CH=CH—, trans —CF=CF—, —COO—, —CH$_2$—CH$_2$—, —CF$_2$—CF$_2$— or a single bond, and n is 0 or 1; and a component B which comprises one or more dielectrically positive compounds of formula II:

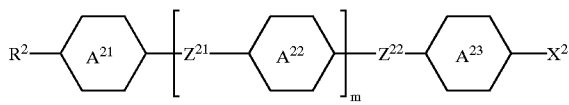

wherein
$R^2$ as the meaning given for $R^{11}$ in this claim, the $A^{21}$, $A^{22}$ and $A^{23}$ rings each independently have the meaning given for the $A^{11}$ ring above
$Z^{21}$ and $Z^{22}$ are independently of each other —CH$_2$CH$_2$—, —COO—, trans —CH=CH—, trans-CF=CF—, —CH$_2$O—, —CF$_2$O— or a single bond,
$X^2$ is, F, Cl, CF$_3$, OCF$_2$H or OCF$_3$ and
m is 0, 1 or 2.

10. A liquid crystal display of claim 9, wherein the liquid crystal medium additionally comprises:

a component C, which comprises one or more compounds of formula III:

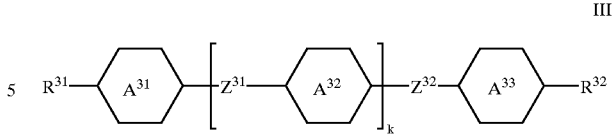

wherein
$R^{31}$ and $R^{32}$ each, independently of each other, have the meaning given for $R^{11}$,
$Z^{31}$ and $Z^{32}$ are, independently of each other, —CH$_2$CH$_2$—, —COO—, —C≡C—, trans-CH=CH—, trans- —CF=CF—, —CH$_2$O—, CF$_2$O— or a single bond,
the $A^{31}$, $A^{32}$ and $A^{33}$ rings each have the meaning given for the $A^{11}$ ring, and
k is 0 or 1.

11. A liquid crystal display of claim 9, wherein the liquid crystal medium additionally comprises:

a component D comprising one or more compounds of formula IV:

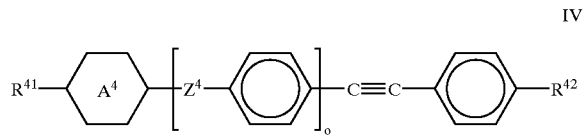

wherein
$R^{41}$ and $R^{42}$ each, independently of each other, have the meaning given for $R^{11}$,

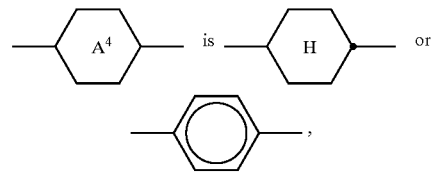

$A^4$ are, independently of each other, —CH$_2$CH$_2$—, —COO—, —C≡C— or a single bond, preferably a single bond and
o is 0 or 1.

12. A liquid crystal display of claim 10, wherein the liquid crystal medium additionally comprises:

a component D comprising one or more compounds of formula

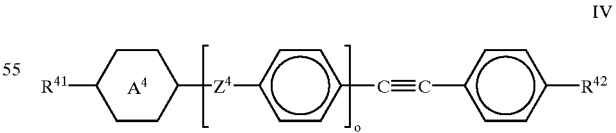

wherein
$R^{41}$ and $R^{42}$ each, independently of each other, have the meaning given for $R^{11}$,

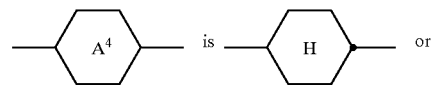

$Z^4$ are, independently of each other, —CH$_2$CH$_2$—, —COO—, —C≡C— or a single bond, preferably a single bond and o is 0 or 1.

13. A liquid crystal display according to claim 9, wherein component A comprises one or more compounds of formula I where

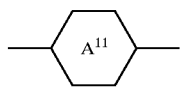

when present, is

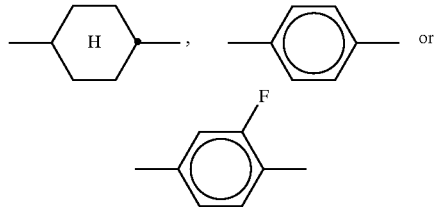

or their mirror images, and/or

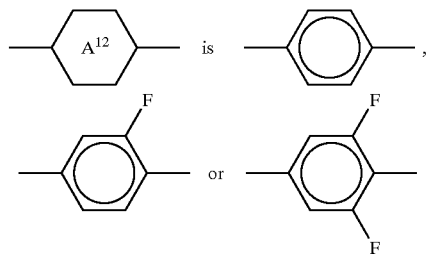

or their mirror images, and/or

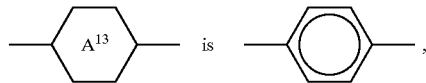

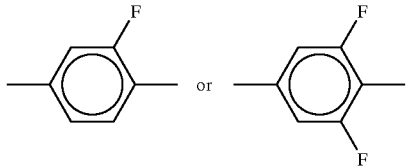

or their mirror images.

14. A liquid crystal display according to claim 9, wherein component A comprises one or more compounds of formula I-7:

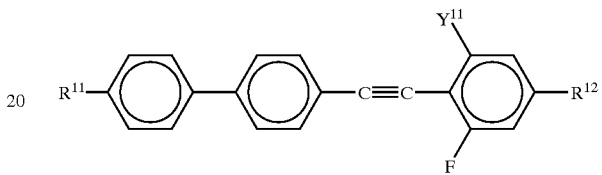

wherein $R^{11}$ and $R^{12}$ have the meanings given and $Y^{11}$ is or F.

15. A liquid crystal display of claim 12, where in the liquid crystal medium comprises by weight:
5–50% of component A,
15–65% of component B,
50% or less of component C, and
40% or less of component D.

16. A liquid crystal display of claim 12, wherein the liquid crystal medium comprises by weight:
15–40% of component A,
25–60% of component B,
6–40% of component C, and
2–30% of component D.

17. A liquid crystal display of claim 12, wherein the liquid crystal medium contains 70–100% by weight of components A, B, C, and D.

18. A liquid crystal display of claim 9, wherein the liquid crystal medium therein has a clearing point of 70° C. or more, a Δn of 0.14 or more, a Δε at 1KH$_z$ and 20° C. of 5 or more and a nematic phase at least encompassing from 0° C. to 70° C.

19. A liquid crystal display according to claim 9, which operates in the TN mode.

* * * * *

UNITED STATES PATENT AND TRADEMARK OFFICE
CERTIFICATE OF CORRECTION

PATENT NO.     : 6,692,796 B2
DATED          : February 17, 2004
INVENTOR(S)    : Ichinose et al.

It is certified that error appears in the above-identified patent and that said Letters Patent is hereby corrected as shown below:

Column 25,
Line 31, "one or ore" should read -- one or more --.
Line 44, "13 rings" should read -- $A^{13}$ rings --.
Line 59, "$A^1$" should read -- $A^{11}$ --.

Column 26
Line 10, "$R^{11}$" should read -- $A^{11}$ --.
Line 19, "trans—CF=CF—," should read -- trans- —CF=CF— --.
Line 38, "A ring" should read -- $A^{11}$ ring --.
Line 47, "or ore" should read -- or more --.
Line 59, "—CH$_2$C$_2$—" should read -- —CH$_2$CH$_2$— --.
Line 60, "—CH$_2$O," should read -- —CH$_2$O—, --.

Column 27,
Line 21, "—CH$_2$CH$_2$," should read -- —CH$_2$CH$_2$— --

Column 29,
Line 35, "trans—CF=CF—," should read -- trans- —CF=CF— --.
Line 52, "as the meaning" should read -- has the meaning --.
Line 57, "trans—CF=CF—," should read -- trans- —CF=CF— --.

Column 30,
Line 13, "—CH$_2$CH$_2$," should read -- —CH$_2$CH$_2$— --
Line 15, "CF$_2$O—" should read -- —CF$_2$O— --.
Line 43, "$A^4$ are, independently of each other, —CH$_2$CH$_2$," should read -- $Z^4$ are, independently of each other, —CH$_2$CH$_2$—, --.
Line 51, "formula" should read -- formula IV --.

Column 31,
Line 6, "—CH$_2$CH$_2$," should read -- —CH$_2$CH$_2$— --.

UNITED STATES PATENT AND TRADEMARK OFFICE
CERTIFICATE OF CORRECTION

PATENT NO. : 6,692,796 B2
DATED : February 17, 2004
INVENTOR(S) : Ichinose et al.

It is certified that error appears in the above-identified patent and that said Letters Patent is hereby corrected as shown below:

<u>Column 32,</u>
Line 26, "is or F" should read -- is H or F --.
Line 27, "where in" should read -- wherein --.

Signed and Sealed this

First Day of February, 2005

JON W. DUDAS
*Director of the United States Patent and Trademark Office*